US 6,618,722 B1

(12) United States Patent
Johnson et al.

(10) Patent No.: US 6,618,722 B1
(45) Date of Patent: Sep. 9, 2003

(54) SESSION-HISTORY-BASED RECENCY-BIASED NATURAL LANGUAGE DOCUMENT SEARCH

(75) Inventors: David E. Johnson, Cortlandt Manor, NY (US); Frank J. Oles, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/624,554

(22) Filed: Jul. 24, 2000

(51) Int. Cl.[7] .............................................. G06F 17/30
(52) U.S. Cl. .................................. 707/5; 707/3; 707/4
(58) Field of Search ................................ 395/336–338, 395/600–606; 345/326–329, 333; 707/1–10, 100–104, 200–206, 500–505, 217, 530; 709/200–253; 704/2

(56) References Cited

U.S. PATENT DOCUMENTS

| | | | |
|---|---|---|---|
| 5,694,559 A | * 12/1997 | Hobson et al. | ............. 395/336 |
| 6,177,932 B1 | * 1/2001 | Galdes et al. | ............... 345/329 |
| 6,418,431 B1 | * 7/2002 | Mahajan et al. | ............... 707/4 |
| 6,434,563 B1 | * 8/2002 | Pasquali et al. | ............. 707/10 |

* cited by examiner

Primary Examiner—Safet Metjahic
Assistant Examiner—Te Y Chen
(74) Attorney, Agent, or Firm—Whitham, Curtis & Christofferson, P.C.; Stephen C. Kaufman

(57) ABSTRACT

A method and apparatus make keyword selection and/or weighting as a function of a session history of user input in order to answer queries submitted by the user to a computer system by providing answers based on stored documents. The aim is to find the best answers by matching stored natural language documents both to the most recent query and to the most latest query in a context that captures the recent history interaction. To do this, answers are matched against a set of keywords extracted from the most recent query as well as a set of keywords extracted from those queries received since the last topic switch was detected. A central feature of the method is for the computer system implementing this method to maintain a session history for each user session history. Keywords are extracted from each query by a system implementing this method. A graded keyword list is a list of keywords paired with ages, which are indicators of how long ago in the session the user employed this keyword in a query. Graded keyword lists are maintained in the session history so the system can assign weights to keywords, with more recently received keywords being assigned higher weights than keywords with comparatively greater ages. The weights assigned to keywords are used in computing scores that indicate closeness of match of a document to a list of keywords.

20 Claims, 5 Drawing Sheets

SESSION-HISTORY-BASED RECENCY-BIASED NATURAL LANGUAGE DOCUMENT SEARCH

CROSS-REFERENCE TO RELATED APPLICATION

This application is related in subject matter to co-pending U.S. patent application Ser. No. 09/339,872, filed on Jun. 25, 1999, by David E. Johnson et al. for "Two Stage Automated Electronic Messaging System", U.S. patent application Ser. No. 09/176,322, filed on Oct. 22, 1998 by David E. Johnson et al. for "Text Categorization Toolkit", and U.S. patent application Ser. No. 09/570,788 by Thilo W. Goetz et al. for "Interactive Automated Electronic Response System" and assigned to the assignee of this application. The disclosures of application Ser. Nos. 09/339,872, 09/176,322 and 09/570,788 are incorporated herein by reference.

BACKGROUND OF THE INVENTION

1. Field of the Invention

The present invention generally relates to natural language document searching in a computer system and, more particularly, to answering queries submitted by a user to the computer system.

2. Background Description

There are several key ideas that together advance the state of the art in document search. In application Ser. No. 09/339,872, the concept of categorizing user input to determine a topic or domain in which to restrict a subsequent keyword search was disclosed. In application Ser. No. 09/570,788, we disclosed the concept of categorizing a session history of user input to further identify and narrow the topic of a search and to determine whether the user has switched topics. The keywords used in the search phase are determined by whether or not the user is refining a topic or switching topics. In the case of topic refinement, we assumed in our prior applications that the keywords used in the search stage were based solely on all the previous input that was in the identified topic. For example, if a user first said "loans", then "auto", then "new", determining at the point of the third input the category "auto loan" and keywords {loan, auto, new}, all the keywords from the input would be sent to the search engine and would be treated as equal. It is assumed that the keyword search is disjunctive and hence the effect on the results of any keyword is independent of when it was entered.

In a session-history-based search system, as introduced in the above co-pending patent applications, there were several key problems to solve: (1) topic identification, (2) topic refinement, (3) topic switch, and (4) keyword selection and/or weighting as a function of the session history. The first three of these issues were solved in the inventions disclosed in the copending patent applications.

SUMMARY OF THE INVENTION

It is therefore an object of the invention to provide a method and apparatus for solving the problem of keyword selection and/or weighting as a function of a session history of user input.

It is another object of the invention to provide a method and apparatus to answer queries submitted by a user to a computer system by providing answers based on stored documents.

According to the invention, the aim is to find the best answers by matching stored natural language documents both to the most recent query, by itself, and to the most recent query in a context that captures the recent history of interaction. To do this, answers are matched against a set of keywords extracted from the most recent query as well as a set of keywords extracted from those queries received since the last topic switch was detected. Thus, the system must detect topic switches. The detection of a topic switch suggests how far back to go in the history before which keywords are deemed irrelevant to subsequent queries. This requires us to assume that there is a set, a hierarchy of, or a partially ordered set (i.e., partially ordered by specificity) of categories to which answers belong, and that, as part of the process of setting up a system implementing this method, the categories to which each answer may belong are recorded in a file or a database. Then the system will take as evidence of a topic switch the system's decision to display an answer to a user that does not belong to any of the most specific categories to which the last answer displayed to the user belonged. If the answer evidencing a topic switch would have been found solely on the basis of keywords extracted from the last query (in other words, would have been found solely on the basis of keywords with age 0), then the system should subsequently stop using keywords from older queries.

The user's queries may be submitted in any way that supports an ongoing exchange with the user, such as through a Web site or via a telephone where the user's speech is converted to text by a speech recognition system.

A central feature of the method according to the invention is for the computer system implementing this method to maintain a session history for each user session history. Keywords are extracted from each query by a system implementing this method. A graded keyword list is a list of keywords paired with ages, which are indicators—generally numerical—of how long ago in the session the user employed this keyword in a query. Graded keyword lists are maintained in the session history so the system can assign weights to keywords, with more recently received keywords being assigned higher weights than keywords with comparatively greater ages. The weights assigned to keywords are used in computing scores that indicate closeness of match of a document to a list of keywords. The scores for all possible answers are compared with a threshold in order to determine which answers have high enough scores to warrant selection as being proper responses to the user's query.

Although we refer to the use in search of keywords extracted from queries, the techniques used in this method could equally well be applied to other features extracted from queries in lieu of keywords, such as (1) phrases consisting of multiple words or (2) features assigned to text on the basis of other processing. Also, a keyword found in text—either a query or an answer—may well be stemmed from or replaced by a canonical form in the process of being identified for use in a system employing this method.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Let us provide some details on computing scores that measure the degree of matching between a document and a graded keyword list. Let D be a document. Let keywords extracted from the most recent query be assigned age 0, those from the preceding query be assigned age 1, and so on, with each earlier query's keywords being assigned an age 1 higher than the keywords from the query preceding it. Let K be a graded keyword list of length m in which the ith keyword is $k_i$ and the age of the keyword $k_i$ is $a_i$. Assume that the keyword $k_i$ occurs $n_i$ times in document D. Let w(j) be the weight assigned to keywords whose age is j. As noted above, we require that $$w(0) \geq w(1) \geq w(2) \geq$$

Then, one way to compute a score s(D,K) measuring the closeness of match of D to K, taking into account the ages of the keywords in K, is to use a weighted linear combination of the numbers of occurrences in D of the keywords K, as given by $$\sum_{i=1}^{m} w(a_i) n_i.$$

Here, a higher score measures a closer match than a lower score. This is just one example. Other similar formulas can be used in specific implementations.

Figure 1:
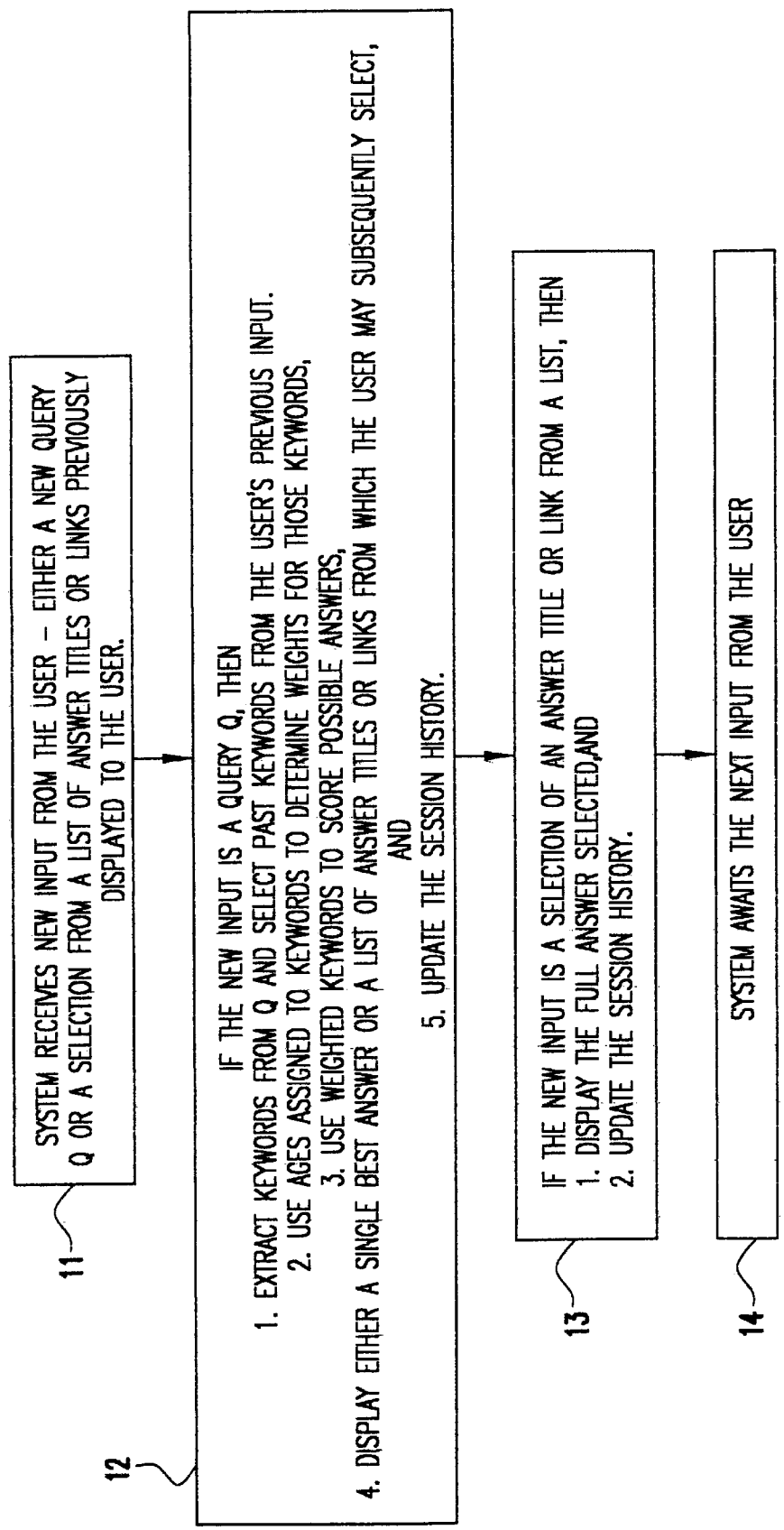
FIG. 1 is a flow diagram showing a high-level description of a history-based search system.

Referring now to the drawings, and specifically to FIG. 1, there is shown a high-level description of the history-based search system according to the invention. In block 11, the system receives a new input from the user. This may be either a new query Q or a selection from a list of answer titles or links previously displayed to the user. In block 12, if the new input is a query Q, then the system 1. extracts keywords from query Q and selects past keywords from the user's previous input,
2. uses ages assigned to keywords to determine weights for those keywords,
3. uses weighted keywords to score possible answers,
4. displays either a single best answer or a list of answer titles or links from which the user may subsequently select, and
5. updates the session history.

In block 13, if the new input is a selection of an answer title or link form a list, then the system 1. displays the full answer selected, and
2. updates the session history.

At the completion of these steps, the system then awaits the next input from the user in block 14.

Figure 2:
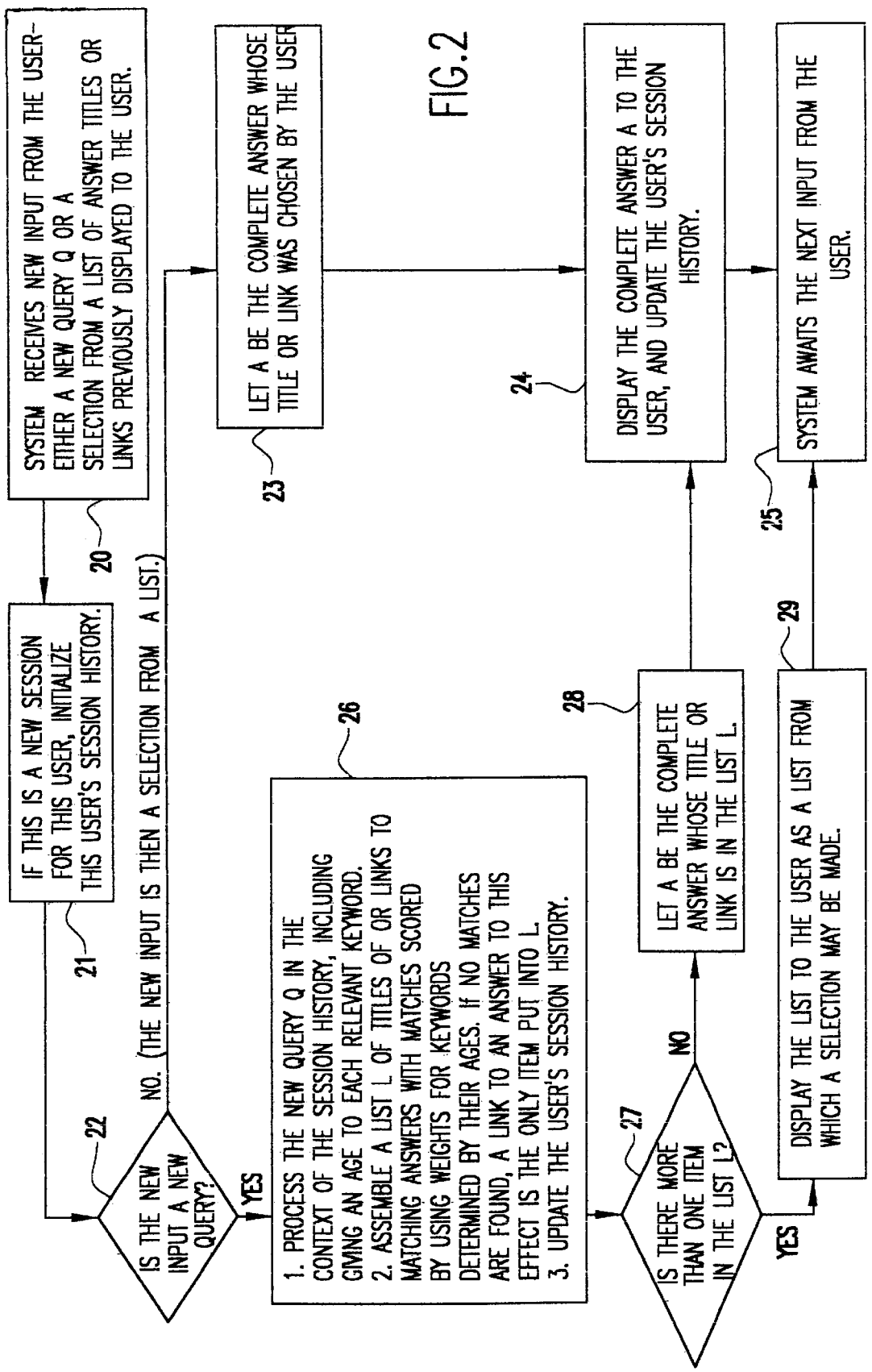
FIG. 2 is a flow diagram illustrating the logic of one design for a history-based search system according to a preferred embodiment of the invention.

FIG. 2 shows in more detail one design for a history-based search system according to the invention. In function block 20, the system receives a new input from the user—either a query Q or a selection from a list of answer titles or links previously displayed to the user. In function block 21, if this is a new session for this user, the system initializes this user's session history. Then in decision block 22, a determination is made as to whether the new user input is a query.

If not, the new input is a selection from a list, and the process branches to function bock 23 where the answer A is selected as the complete answer whose title or link was chosen by the user. The answer A is displayed to the user in function block 24 and the user's session history is updated. Then, in function block 25, the system awaits the next input from the user.

If the new input is a new query as determined in decision block 23, then the system performs the following processing steps in function block 26:

1. Process the new query Q in the context of the session history, including giving an age to each relevant keyword.
2. Assemble a list L of titles of or links to matching answers, with matches scored by using weights for keywords determined by their ages. If no matches are found, a link to an answer to this effect is the only item put into list L.
3. Update the user's session history.

Following this processing, a determination is made in decision block 27 as to whether there is more than one item in list L. If not, the answer A is the complete answer whose title or link is in the list and is output via function block 28 to the display function in function block 24. If, however, there is more than one item in the list L, the list is displayed to the user as a list from which a selection may be made in function block 29. Then the system awaits the next input from the user in function block 25.

Figure 3:
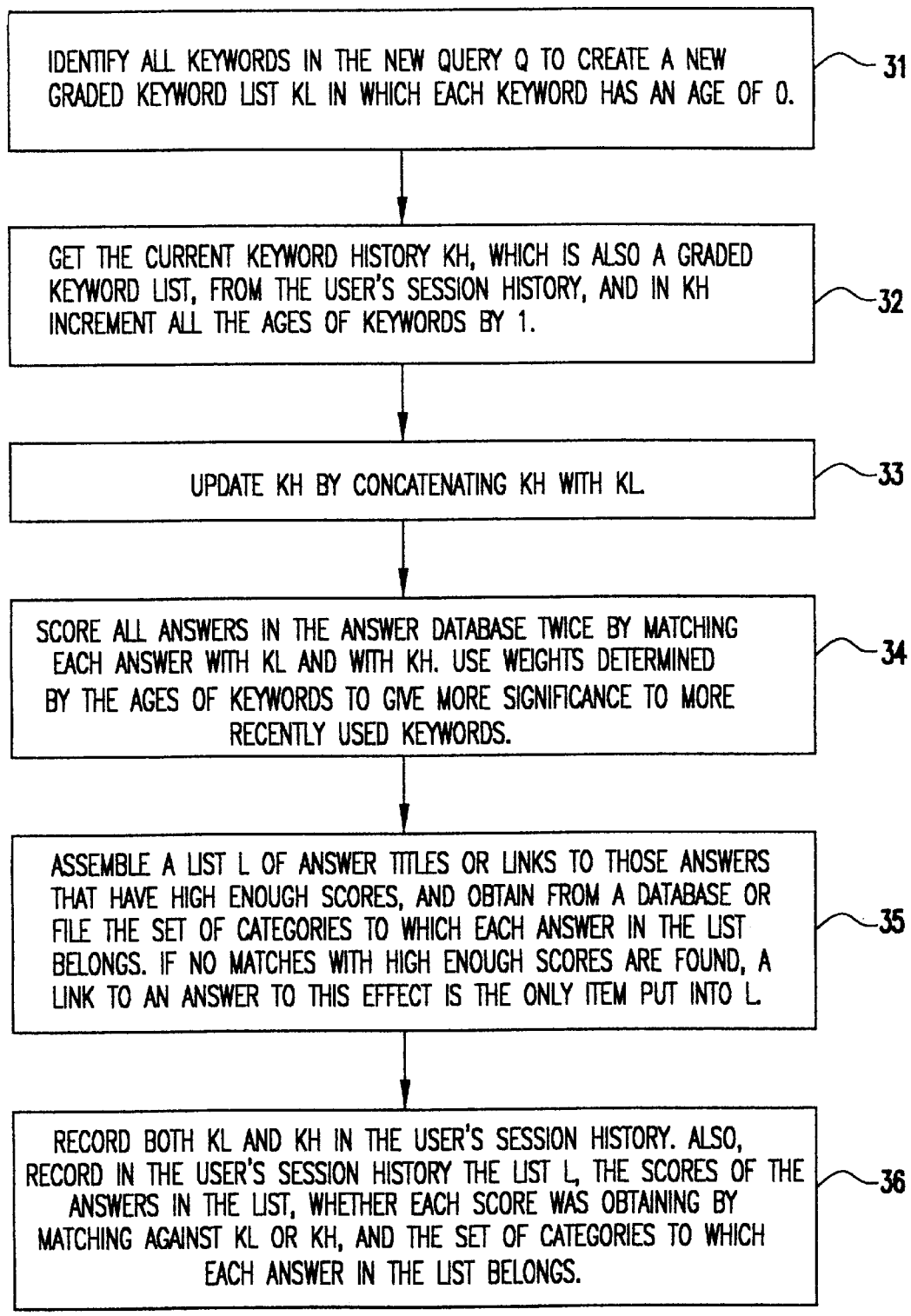
FIG. 3 is a flow diagram showing in more detail a processing routine called by the method shown in FIG. 2.

The details of the processing steps in function block 26 of FIG. 2 are shown in FIG. 3. The processing begins by identifying all keywords in the new query Q to create a new graded keyword list KL in which each keyword has an age of 0 in function block 31. Then, in function block 32, the current keyword history KH is retrieved. This is also a graded keyword list which is retrieved from the user's session history. The ages of all the keywords in keyword history KH are incremented by 1. The keyword history KH is updated in function block 33 by concatenating KH and KL. All answers in the answer database are scored twice in function block 34 by matching each answer with KL and KH. The weights determined by the ages of the keywords are used to give more significance to more recently used keywords. A list L of answer titles or links to those answers that have high enough scores are assembled in function block 35. The set of categories to which each answer in the list L belongs is obtained from a database or file. If no matches with high enough scores are found, a link to an answer to this effect is the only item put into list L. In function block 36, both the keyword list KL and the keyword history KH are recorded in the user's session history. Also, a record is made in the user's session history the list L, the scores of the answers in the list, whether each score was obtained by matching against KL or KH, and the set of categories to which each answer in the list L belongs.

Figure 4:
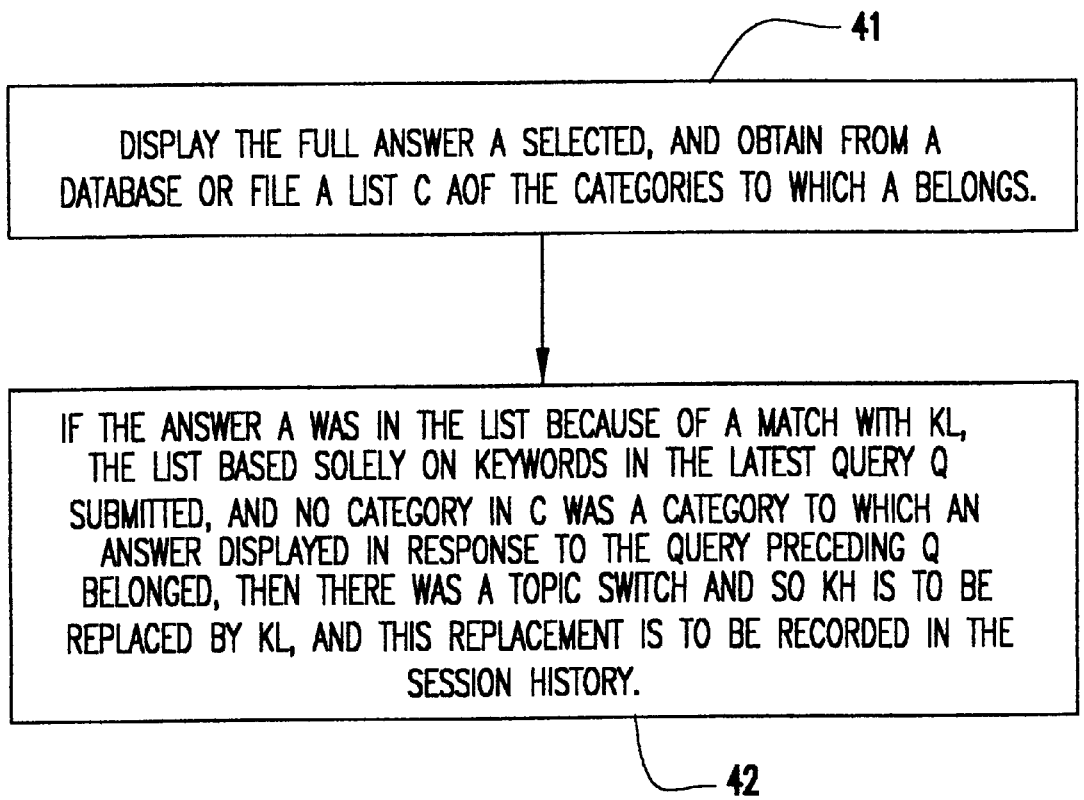
FIG. 4 is a flow diagram showing in more detail a display routing called by the method shown in FIG. 2.

The details of the display step in function block 24 of FIG. 2 are shown in FIG. 4. The full answer A selected is displayed in function block 41. In addition, a list C of the categories to which the answer A belongs is obtained from a database or file. In function block 42, if the answer A was in the list L because of a match with keyword list KL, the list based solely on keywords in the latest query Q submitted, and no category in C was a category in which an answer displayed in response to the query preceding Q belonged, then there was a topic switch and so keyword history KH is to be replaced by KL, and this replacement is recorded in the session history.

Figure 5:
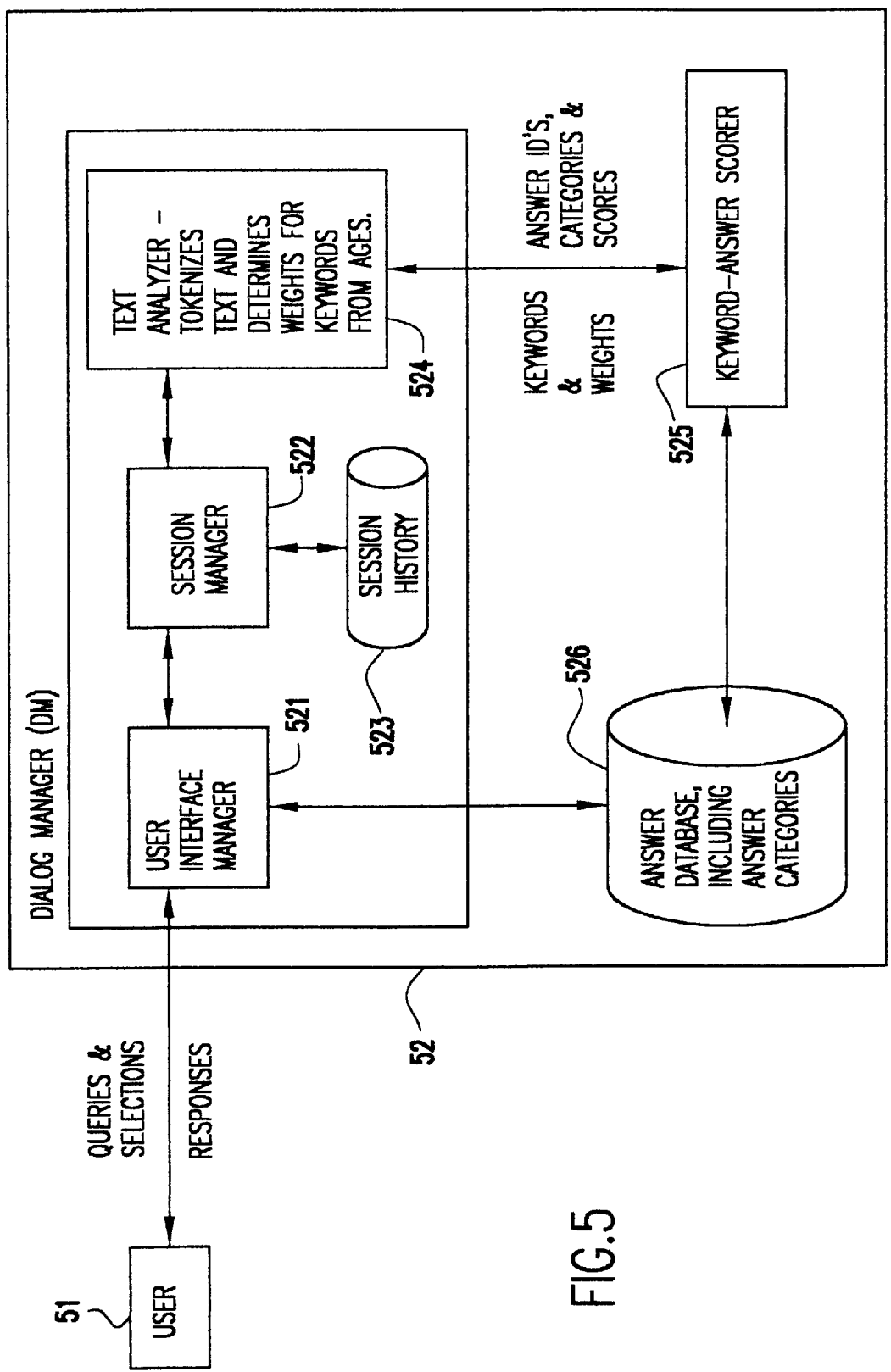
FIG. 5 is a block diagram illustrating a preferred architecture of the history-based search system according to the invention.

FIG. 5 shows one component architecture of the history-based search system according the invention. The user 51 inputs questions and makes selections as inputs to the dialog manager 52 which, in turn, provides responses to the user. The dialog manager includes a user interface manager 521 which provides input to and receives output from a session manager 522. The session manager is responsible for maintaining the session history 523. A user input received by the user interface manager 521 is passed to the session manager 522, and the session manager 522 passes the input, in the form of text, to text analyzer 524. The text analyzer 524 tokenizes the text and determines weights for keywords from the ages of the keywords. The text analyzer outputs keywords and weights to keyword/answer scorer 525 which responds with answer identifications (IDs), categories and scores. The scores are used by the text analyzer 524 to filter out those answers whose scores are not high enough to meet a threshold. The categories returned are used by the text analyzer 524 to determine whether or not there has been a topic switch, in order to determine in turn if the feature history should be updated. The results, including an answer ID or a list of answer IDs, of the text analyzer's process of the data provided by feature answer scorer 525 are passed bact to the session manager 522, which updates the session history 523. The session manager passes the answer ID or list of answer IDs to the user interface manager 521. Using this information, the user interface manager 521 accesses an answer database 526, including answer categories, to generate an output to the user.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for answering natural language queries submitted by a user to a computer system by providing answers based on stored documents comprising the steps of:
   receiving a new input from the user either as a new query Q or a selection from a list of answer titles or links previously displayed to the user;
   maintaining a session history of prior user inputs;
   extracting features from query Q and selecting past features from prior user inputs corresponding to said session history;
   determining weights for those features using ages assigned to the respective features;
   scoring possible answers using weighted features;
   displaying either a single best answer or a list of answer titles or links from which the user may subsequently select;
   updating the session history; and
   if the new input is a selection of an answer title or link from said list, then displaying a full answer selected and updating the session history.

2. The method for answering natural language queries submitted by a user to a computer system recited in claim 1, wherein the step of extracting features from query Q includes the step of creating a new graded feature list KL in which each feature in the list has an age of zero.

3. The method for answering natural language queries submitted by a user to a computer system recited in claim 2, wherein the step of selecting past features includes the step of getting a current feature history KH, which is also a graded feature list, from the session history and the step of determining weights includes the step of incrementing all ages of the features in feature history KH by one.

4. The method for answering natural language queries submitted by a user to a computer system recited in claim 3, further comprising the step of updating the feature history KH by concatenating KH with KL.

5. The method for answering natural language queries submitted by a user to a computer system recited in claim 3, wherein the step of scoring possible answers includes the step of matching each answer in an answer database with KL and KH.

6. The method for answering natural language queries submitted by a user to a computer system recited in claim 5, further comprising the step of assembling a list L of answer titles or links to those answers having scores exceeding a predetermined value and obtaining from a database or file a set of categories C to which each answer in the list L belongs.

7. The method for answering natural language queries submitted by a user to a computer system recited in claim 6, wherein if there are no matches with scores exceeding said predetermined value, inserting as an only item in said list L a link to an answer that there are no matches.

8. The method for answering natural language queries submitted by a user to a computer system recited in claim 6, wherein the step of updating the session history includes the step of recording KL and KH, the list L, scores of answers in list L, and the set of categories to which each answer in the list L belongs in the user's session history.

9. The method for answering natural language queries submitted by a user to a computer system recited in claim 6, wherein if an answer was in the list L because of a match with KL and no category in C was a category to which an answer displayed in response to a query preceding Q belonged, then declaring a topic switch and replacing KH by KL and recording the replacement in the session history.

10. The method for answering natural language queries submitted by a user to a computer system recited in claim 1, wherein the features extracted from a query Q are selected from the group consisting of keywords, phrases consisting of multiple words and features assigned to text on the basis of other processing.

11. A computer system for answering natural language queries submitted by a user by providing answers based on stored documents comprising:
   a user interface receiving a new input from the user either as a new query Q or a selection from a list of answer titles or links previously displayed to the user;
   a session manager maintaining a session history of prior user inputs in a session history database;
   a text analyzer extracting features from query Q and selecting past features from prior user inputs corresponding to said session history;
   a feature/answer scorer receiving extracted features from the text analyzer and determining weights for those features using ages assigned to the respective features and scoring possible answers using weighted features, said feature/answer scorer accessing an answer database including answer categories and providing answer identifications, categories and scores to the text analyzer;
   said user interface displaying either a single best answer or a list of answer titles or links from which the user may subsequently select and said session manager updating the session history, but if the new input is a selection of an answer title or link from said list, then said user interface displaying a full answer selected and session manager updating the session history.

12. The computer system for answering natural language queries submitted by a user recited in claim 11, wherein the text extractor creates a new graded feature list KL in which each feature in the list has an age of zero.

13. The computer system for answering natural language queries submitted by a user recited in claim 12, wherein the session manager gets a current feature history KH from the session history database, which feature history KH is also a graded feature list, and the session manager increments all ages of the features in feature history KH by one.

14. The computer system for answering natural language queries submitted by a user recited in claim 13, wherein the session manager updates the feature history KH by concatenating KH with KL.

15. The computer system for answering natural language queries submitted by a user recited in claim 13, further comprising an answer database including answer categories and wherein the feature/answer scorer matches each answer in the answer database with KL and KH.

16. The computer system for answering natural language queries submitted by a user recited in claim 15, wherein the feature/answer scorer assembles a list L of answer titles or links to those answers having scores exceeding a predetermined value and obtains from the answer database or file a set of categories C to which each answer in the list L belongs.

17. The computer system for answering natural language queries submitted by a user recited in claim 16, wherein if there are no matches with scores exceeding said predetermined value, the feature/answer scorer inserts as an only item in said list L a link to an answer that there are no matches.

18. The computer system for answering natural language queries submitted by a user recited in claim 16, wherein the session manager updates the session history database by recording KL and KH, the list L, scores of answers in list L, and the set of categories to which each answer in the list L belongs in the user's session history.

19. The computer system for answering natural language queries submitted by a user recited in claim 16, wherein if an answer was in the list L because of a match with KL and no category in C was a category to which an answer displayed in response to a query preceding Q belonged, then the text analyzer declares a topic switch and the session manager replaces KH by KL and records the replacement in the session history database.

20. The computer system for answering natural language queries submitted by a user recited in claim 11, wherein the features extracted by the text extractor from a query Q are selected from the group consisting of keywords, phrases consisting of multiple words and features assigned to text on the basis of other processing.

* * * * *